(12) United States Patent
Dumas (10) Patent No.: US 6,920,970 B1
(45) Date of Patent: Jul. 26, 2005

(54) HIGH PERFORMANCE CLUTCH PACK FOR TRANSMISSION

(75) Inventor: Andrew D. Dumas, Bellows Falls, VT (US)

(73) Assignee: Sonnax Industries, Inc., Bellows Falls, VT (US)

( * ) Notice: Subject to any disclaimer, the term of this patent is extended or adjusted under 35 U.S.C. 154(b) by 0 days.

(21) Appl. No.: 10/347,943

(22) Filed: Jan. 21, 2003

Related U.S. Application Data

(60) Provisional application No. 60/350,058, filed on Jan. 23, 2002.

(51) Int. Cl.[7] .................. F16D 25/0368; B23P 15/00
(52) U.S. Cl. ......................... 192/85 AA; 29/401.1; 192/70.2
(58) Field of Search ................. 192/85 AA, 3.52, 192/70.2; 475/316, 269; 29/401.1

(56) References Cited

U.S. PATENT DOCUMENTS

| | | | | | |
|---|---|---|---|---|---|
| 2,965,207 | A | * | 12/1960 | Snyder | 192/85 AA |
| 3,072,220 | A | * | 1/1963 | Babbitt, Jr. et al. | 188/71.5 |
| 3,497,044 | A | * | 2/1970 | Kalns | 192/223 |
| 4,509,626 | A | * | 4/1985 | Jones | 192/85 AA |
| 4,724,941 | A | * | 2/1988 | Wirkner | 192/85 AA |
| 5,029,686 | A | * | 7/1991 | Yesnik | 192/70.14 |
| 5,328,008 | A | * | 7/1994 | Sano | 192/17 R |
| 5,520,589 | A | * | 5/1996 | Dewald et al. | 475/231 |
| 6,158,265 | A | * | 12/2000 | Prater | 73/326 |
| 6,311,815 | B1 | * | 11/2001 | Riggle et al. | 192/70.14 |
| 6,315,096 | B1 | * | 11/2001 | Dairokuno et al. | 192/35 |

OTHER PUBLICATIONS

"Powerglide Frictions and Steels" and "Powerglide Hard Parts", (Apr. 24, 2001), http://www.eastcoasttransmissions.com/ect/frictionsteel/htm and http://eastcoasttransmissions.com/ect/hardparts.htm.*

"G.M. Powerglide High Clutch Powerpack", (Jan. 24, 2001), http://www.altousa.com/ib19755hp.htm.*

* cited by examiner

Primary Examiner—Rodney H. Bonck
(74) Attorney, Agent, or Firm—Clifford F. Rey (57) ABSTRACT

A high performance clutch pack assembly for use in the high gear clutch of a Powerglide transmission is disclosed. The present clutch assembly is disposed in a modified clutch drum having weight reduction features for receiving a modified clutch pack comprising up to ten friction disks and eleven steel disks, which represents a 150 per cent increase in surface contact area and holding force in comparison to the original equipment Powerglide clutch pack having only four friction disks and five steel disks. The present clutch pack assembly is actuated by a modified clutch piston having an increased stroke correlated to the increased number of friction disks providing maximum holding force for the present clutch pack assembly with minimal increase in rotating mass.

18 Claims, 7 Drawing Sheets

Power Flow in Low

FIG. 1A
PRIOR ART

Power Flow in High

HIGH PERFORMANCE CLUTCH PACK FOR TRANSMISSION

CROSS-REFERENCE TO RELATED APPLICATION

This application claims the benefit under 35 U.S.C. 119(e) of U.S. Provisional Patent Application No. 60/350,058 filed Jan. 23, 2002 entitled Clutch Pack for POWERGLIDE Transmission.

BACKGROUND OF INVENTION

The present invention relates to automatic transmission systems and, more particularly, to a high performance clutch pack assembly for a POWERGLIDE automatic transmission.

The popularity of the POWERGLIDE automatic transmission (hereinafter "POWERGLIDE") dates back to the 1950's and continues to the present date. Modifications to the stock POWERGLIDE are well known among high-performance and class racing enthusiasts where every advantage is required.

More specifically, modifications to the clutch pack in the POWERGLIDE are aimed at increasing the holding power of the clutch assembly. For the most part original equipment manufacture (hereinafter "OEM") used four friction disks (hereinafter "frictions") in the OEM high clutch pack. Adding frictions increases the holding power of the clutch pack. The added friction surface area has the same effect as installing a larger diameter clutch in a manual transmission vehicle. Basically, the more power or vehicle weight involved, the larger the friction surface area required. Installing five frictions in the clutch over the stock four increases the friction surface area by 20 percent. Accordingly, installing eight frictions in a POWERGLIDE high clutch that originally had four increases the friction surface area and holding power by 100 percent.

The downside to the extra friction surface area is the increase in rotating mass. In the POWERGLIDE the high clutch frictions are spinning at input shaft speed when the transmission is in low gear. Consequently the increased number of frictions can affect performance.

Thus, the present invention has been developed to provide substantially increased friction surface area in the POWERGLIDE clutch with minimal increase to the rotating mass of the clutch assembly.

SUMMARY OF THE INVENTION

Accordingly, the present invention is a high performance clutch pack assembly for a POWERGLIDE transmission including a modified clutch drum for receiving up to ten friction disks and eleven steel disks, which represents a 150% increase in surface contact area and holding force in comparison to the OEM clutch pack assembly having only four friction disks. The present clutch pack assembly also includes a modified clutch hub to accommodate the increased number of friction disks and a modified clutch piston having an increased stroke correlated to the increased number of friction disks and steel disks providing maximum holding force with minimal increase in rotating mass.

In addition, the present clutch drum is constructed of ductile iron (FC 600) in comparison to the grey iron (FC 250) used for the OEM clutch drum making it stronger and also includes weight reduction features to counterbalance the weight of the increased number of friction disks.

BRIEF DESCRIPTION OF THE DRAWINGS

The novel features of the present invention are set forth in the appended claims. The invention itself, however, as well as other features and advantages thereof will be best understood by reference to the following detailed description of an illustrative embodiment when read in conjunction with the accompanying figures, wherein:

DETAILED DESCRIPTION OF THE PREFERRED EMBODIMENTS

Prior to describing the present invention in detail it may be beneficial to briefly review the major components and basic function of the POWERGLIDE transmission. With reference to the drawings there is shown therein a diagrammatic view of the major components of a POWERGLIDE transmission, indicated generally at 75 and illustrated in FIGS. 1A and 1B. The major components thereof are identified and labeled for reference purposes. In stock form the POWERGLIDE is a two speed automatic transmission. The POWERGLIDE uses two multiple-plate clutches and a brake band to control the planetary gear set. Using these components and various control devices, the transmission 75 provides the following gear positions: Park (P), Reverse (R), Neutral (N), Drive (D), and Low (L).

Figure 1A:
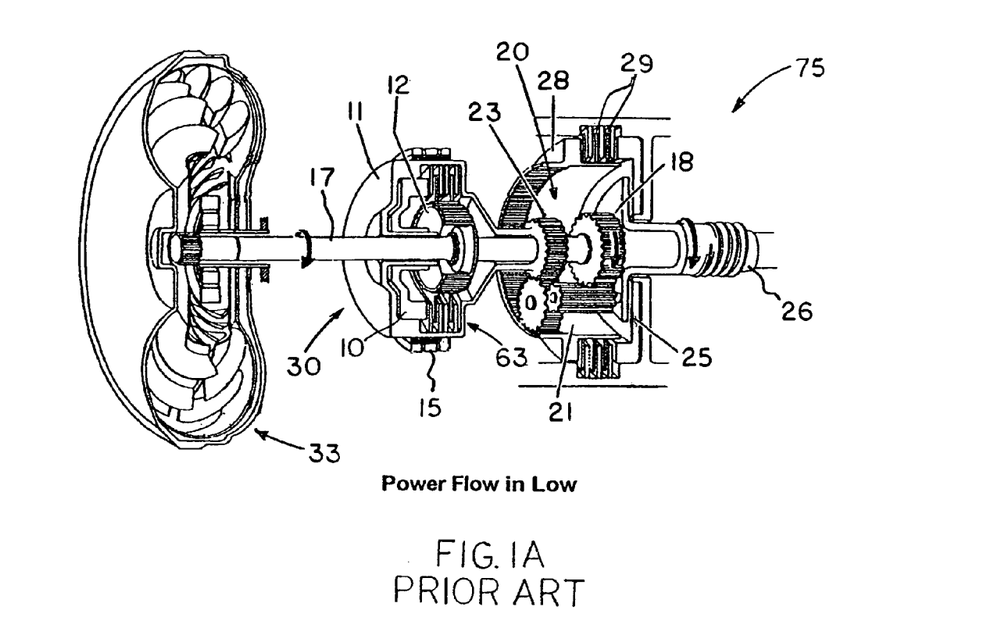
FIG. 1A is a partial cutaway perspective diagram of selected major components of the POWERGLIDE transmission illustrating power flow in low gear.

Referring to FIG. 1A, when the shift lever (not shown) is in low gear, the manual valve in the valve body (not shown) directs pressure to the low servo which applies the low band 15. The low band 15 holds the high clutch drum 11 and the low sun gear 23 stationary. Because the input shaft 17 from the torque converter 33 is splined to the input sun gear 18 in the rear of the planetary set, indicated generally at 20, the input sun gear 18 rotates. As can be seen in FIG. 1A, the long pinions in the planetary set 20 are meshed with the input sun gear 18. The long pinions 21 are also meshed with the short pinions 22, which are in turn meshed with the low sun gear 23. The rotating input sun gear 18 turns the long stationary pinions 21. Because the clutch drum 11 is being held, the short pinions 22 are forced to "walk" around the low sun gear 23. This turns the planetary carrier 25, to which the output shaft 26 is attached. The gear reduction is derived from the difference in the number of teeth on the input sun gear 18 and low sun gears 23.

Figure 1B:
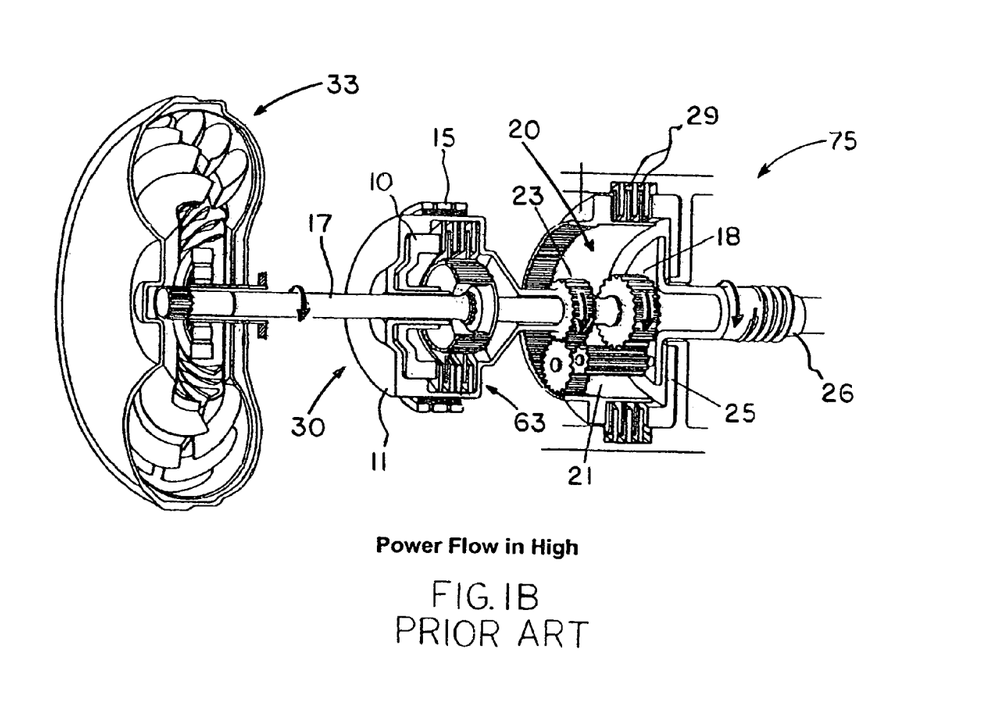
FIG. 1B is a partial cutaway perspective diagram of selected major components of the POWERGLIDE transmission illustrating power flow in high gear.

In high gear, the low band 15 is released and the forward (i.e. high) clutch assembly, indicated generally at 30, is applied. Because the input shaft 17 is splined to the friction disks in the clutch drum 11 through the clutch hub 12 as shown in FIG. 1B, the clutch drum 11 turns with the input shaft 17 when the clutch is applied. The low sun gear 23 also turns with the input shaft 17 when the forward clutch assembly 30 is applied. Because the input shaft 17 is splined to the input sun gear 18 in the rear of the planetary carrier 25, it also is turning with the input shaft 17. This action effectively locks up the planetary set 20 and the entire planet carrier 25 rotates together. This rotation occurs at the same speed as the input shaft 17 providing a one to one high gear ratio. The high clutch drum 11, reverse ring gear 28, and reverse frictions 29 are spinning in high gear.

Figure 2:
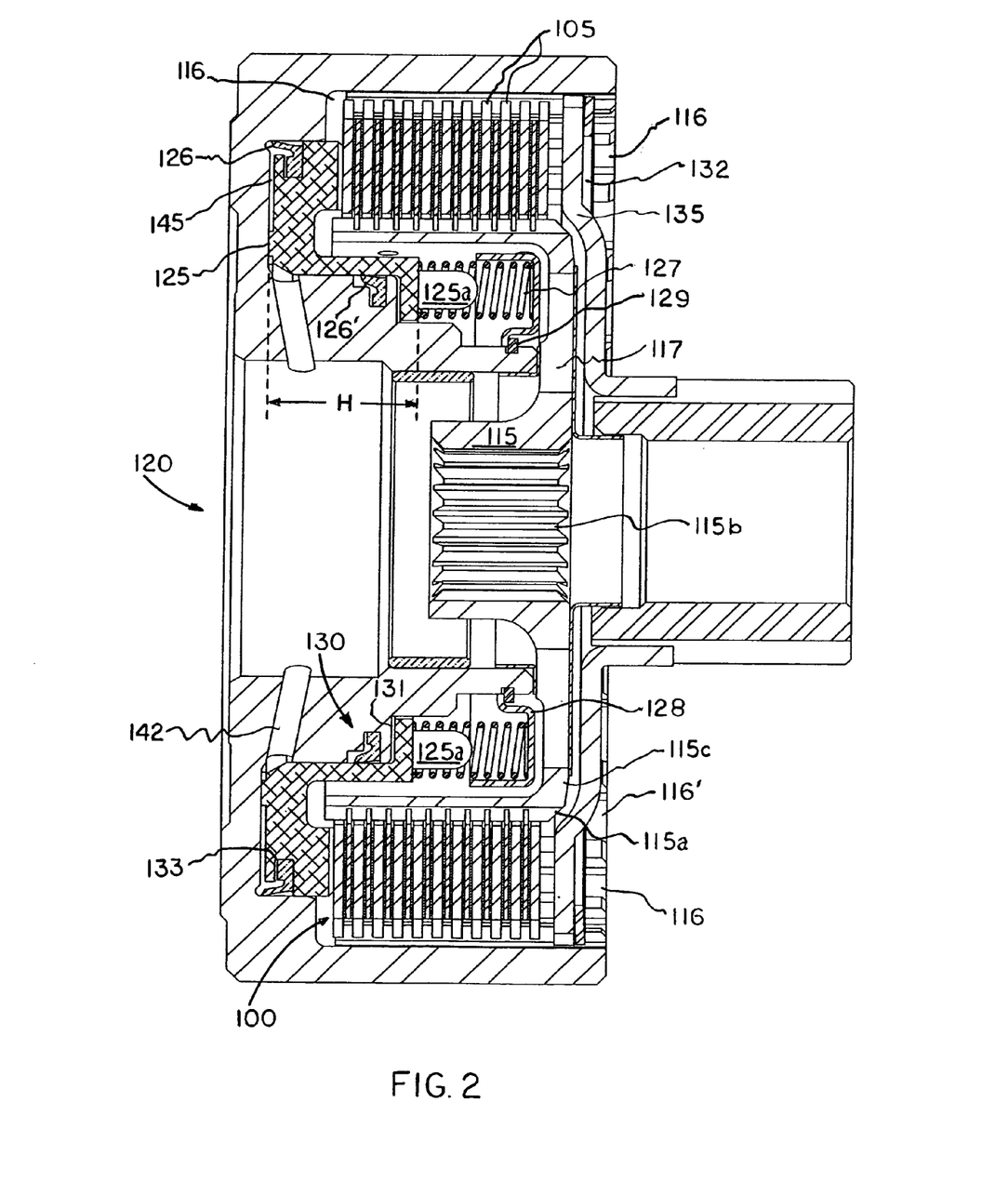
FIG. 2 is a cross-sectional view of the POWERGLIDE clutch pack assembly of the present invention showing the details of the construction thereof.

The present invention relates to improvements in the OEM forward clutch pack 63, clutch piston 10, the clutch drum 11, and clutch hub 12, which will now be described. With reference to FIG. 2, there is shown therein an improved POWERGLIDE clutch pack assembly in accordance with the present invention, indicated generally at 100. In the preferred embodiment, the present clutch pack assembly 100 includes a total of ten friction disks 110 and eleven steel disks 105 respectively. It will be noted that installing ten friction disks 110 in the present clutch pack represents a 150% increase in surface contact area and holding force in comparison to the standard POWERGLIDE clutch pack having four friction disks.

Figure 3:
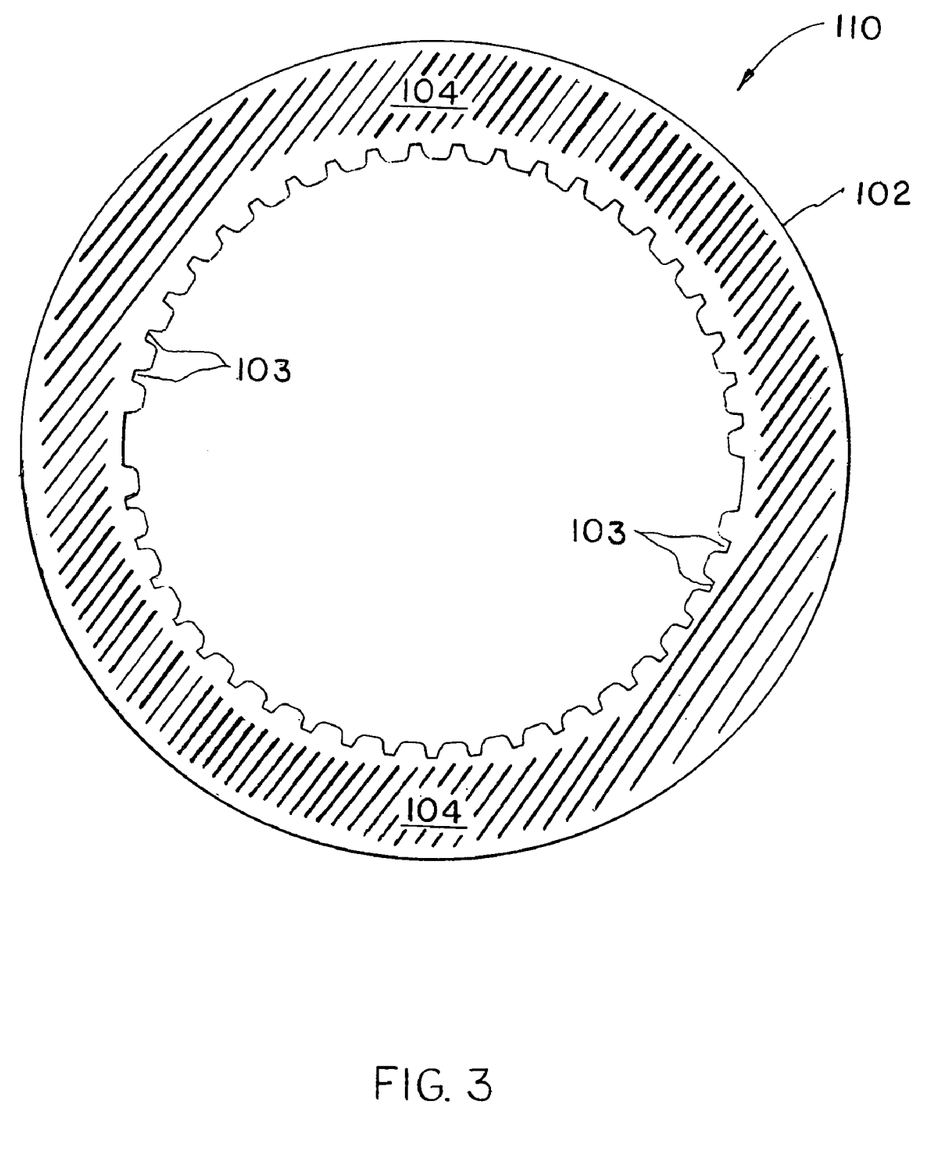
FIG. 3 is a plan view of a friction disk of the present clutch pack assembly.

Referring now to FIG. 3 each friction disk 110 is comprised of a core member 102 fabricated from steel or other material suitable for this purpose. Core members 102 include an internal spline 103 formed on the inside diameter thereof for mating engagement with the external spline 115a formed on the outside diameter of the clutch hub 115 (FIG. 2). Each core member 102 is provided with a die cut layer of friction material as at 104 and also on the opposite surface thereof, which is secured to the core member 102 by a suitable adhesive such as thermosetting resin.

In the preferred embodiment a frictional material such as WPC PREMIUM RED™, ALTO RED EAGLE™, RAYBESTOS BLUE PLATE SPECIAL™ or other frictional material having physical and chemical properties suitable for this application is provided.

Figure 4:
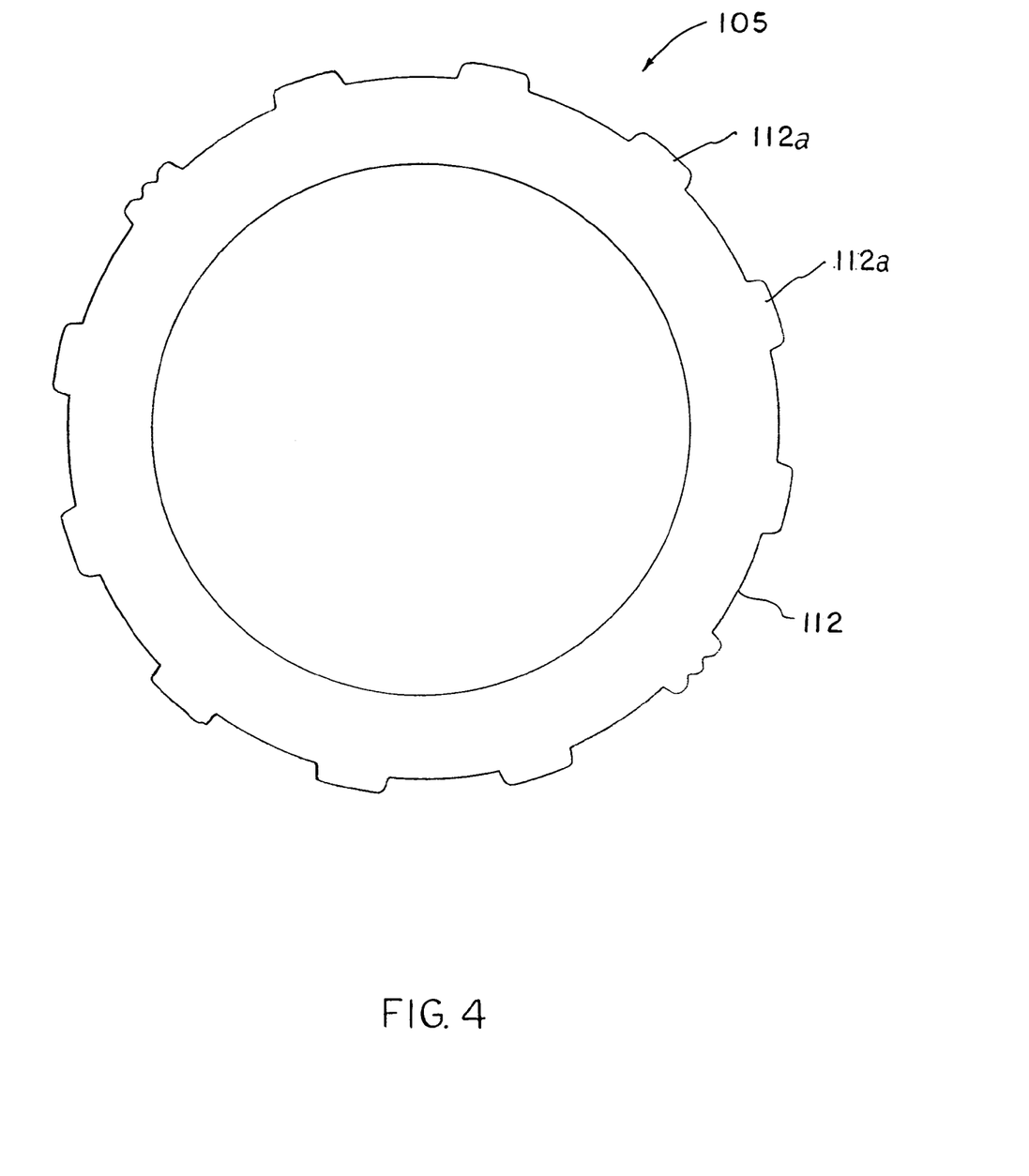
FIG. 4 is a plan view of a steel disk of the present clutch pack assembly.
Figure 5A:
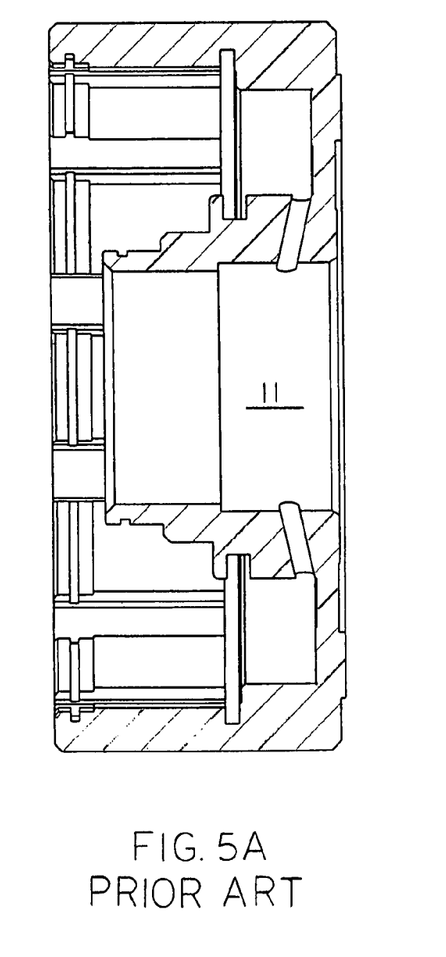
FIG. 5A is a cross-sectional view of the OEM clutch drum labeled Prior Art.
Figure 5B:
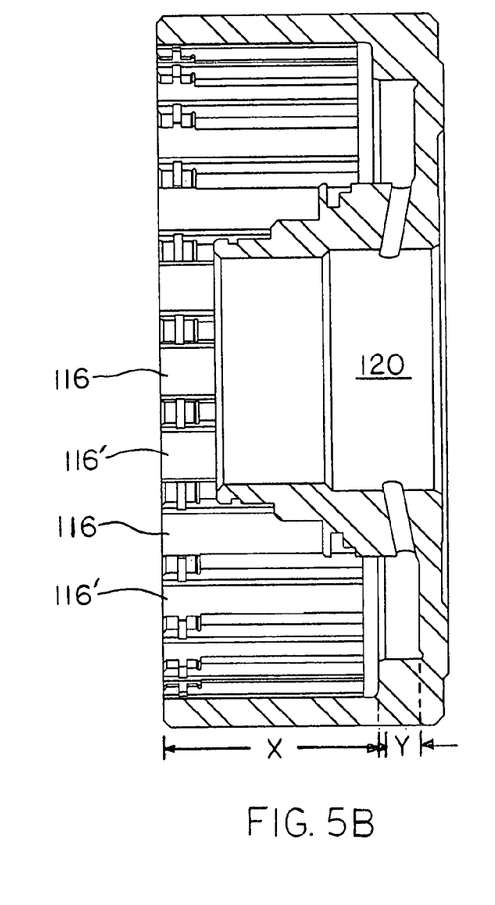
FIG. 5B is a cross-sectional view of the modified clutch drum of the present invention.

A steel disk 105 (hereinafter "steel(s)") is illustrated in FIG. 4. In the preferred embodiment each steel 105 also includes a body member 112 having twelve anti-rotation tabs 112a formed thereon and projecting outwardly therefrom. Anti-rotation tabs 112a are designed for sliding engagement with a mating pattern of twelve axial grooves 116 formed in the interior wall of the clutch drum, indicated generally at 120, as most clearly shown in FIG. 5. It will be appreciated that although anti-rotation tabs 112a prevent rotation, steels 105 are capable of axial movement within the grooves 116 or 116' formed in the clutch drum 120 during operation as explained hereinafter in further detail.

It will be appreciated that the increased number of frictions 110 and steels 105 and the corresponding increased length of the clutch pack assembly 100 requires modification of the present clutch drum 120, the clutch hub 115, and the clutch piston assembly, indicated generally at 130, as shown more clearly in FIGS. 5A and 5B. In the present invention the axial length of grooves 116, 116' defined by dimension "X" in FIG. 5B has been increased in comparison to the OEM clutch drum to accommodate the increased number of frictions 110 and steels 105.

Accordingly, the length of the piston bore defined by dimension "Y" in FIG. 5B is decreased in comparison to the OEM clutch drum 11 (FIG. 5A). However, the operating stroke of the piston 125 has been increased to accommodate the increased number of frictions 110 and steels 105 as explained hereinafter in further detail.

The clutch drum 120 has also been modified in comparison to the OEM design to include weight-reducing means formed therein to compensate for any additional weight increase due to the increased number of frictions 110 and steels 105 in the clutch pack assembly 100. Such weight-reducing means include, but are not limited to, the following structures. In the preferred embodiment the present clutch drum 120 is provided with a secondary pattern of twelve grooves 116' machined in parallel, spaced apart relation at a position rotated 15 degrees about the center axis and intermediate the primary pattern of grooves 116. The secondary grooves 116' are identical in all aspects to the primary grooves 116. Thus, it will be understood that either pattern of grooves 116, 116' may receive the steels 105 in sliding engagement during assembly of the present clutch pack 100.

The increased length of the clutch pack 100 also requires a corresponding increase in the axial length of the spline 115a on the clutch hub 115 whereon the friction disks 110 are slidingly engaged. In the preferred embodiment the spline 115a of the present clutch hub 115 has been lengthened approximately 0.150" in comparison to the OEM design. The design of the present clutch hub 115 also provides weight-reducing means including, but not limited to, the following structures. Clutch hub 115 includes a plurality of weight-reducing holes 117 formed within the radial web 151c of the hub 115 at predetermined locations to compensate for the increased axial length of the spline 115a and the corresponding weight increase of the hub 115.

Further, the present clutch hub 115 is constructed from a steel forging in accordance with AISI 1045, which is significantly stronger than the OEM hub casting. The increased number of frictions 110 and steels 105 also requires modification of the clutch piston 125 including a reduction in the overall axial length as at dimension "H" (FIG. 2) in comparison to the OEM design. However, the operating stroke of the piston 125 has been increased to compensate for the increased number of frictions 110, which require 0.008–0.010" clearance therebetween when the clutch is not applied and the frictions 110 rotate freely within the modified clutch pack.

Figure 6A:
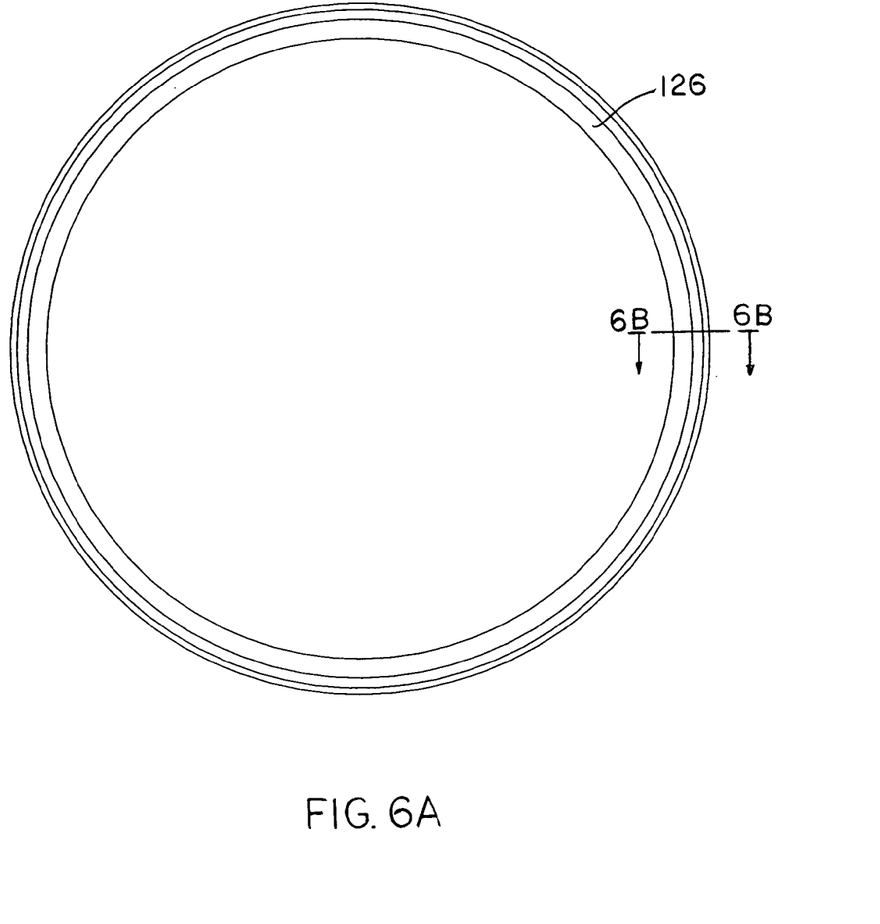
FIG. 6A is an elevational view of the radial lip seal removed from the clutch piston.
Figure 6B:
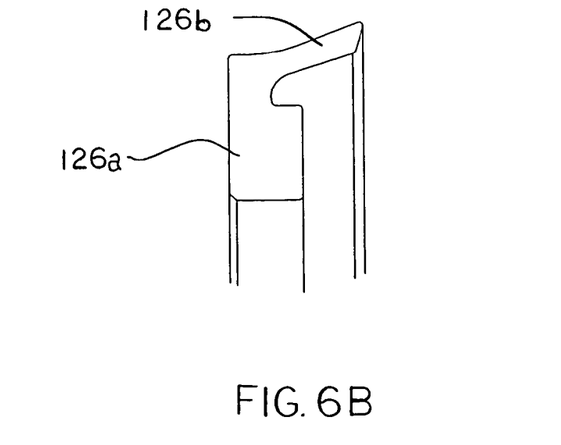
FIG. 6B is an enlarged cross-sectional view of the radial lip seal taken along the section line 6B—6B of FIG. 6A.

The present piston 125 also includes a primarily radial lip seal 126 as shown in FIGS. 6A and 6B. As most clearly shown in FIG. 6B, the lip seal 126 includes a core member 126a which is generally rectangular in cross-section that is integrally formed with an outwardly angled lip portion 126b. The lip seal 126 is installed in a modified groove 133 formed about the peripheral, leading edge of the clutch piston 125 to affect a seal within the piston chamber 145 as shown in FIG. 2. In the preferred embodiment lip seal 126 is fabricated from fluorocarbon rubber material in the 90 durometer range. A secondary lip seal 126' of substantially similar construction is installed within groove 131 formed in the drum 120 to seal the inner surface of the piston 125 (FIG. 2).

The present clutch piston 125 is fabricated from a high-grade material such as AISI 2014-T6 or AISI 7075-T6 forging or billet in comparison to the OEM die cast piston.

In an assembly procedure of the present clutch pack assembly 100, the piston 125 including radial lip seal 126 as shown in FIG. 2 is initially inserted in the clutch drum 120 with lip seal 126' preinstalled thereon. Next, the compression springs 127 are positioned on spring guides 125a and the spring retainer 128 is installed being secured in position by retaining ring 129 as shown in FIG. 2.

Next, the frictions 110 and steels 105 are arranged alternately within the drum 120 in the following manner: piston, steel, friction, steel, friction, steel, friction, steel, friction, steel, friction, steel, friction, steel, friction, steel, friction, steel, friction, steel, friction, steel, pressure plate such that all of the frictions 110 slidingly engage the spline 115a on the clutch hub 115. It will be appreciated that frictions 110 and steels 105 are arranged such that adequate clearance is maintained therebetween to permit proper operation without excessive wear. Next, the pressure plate 135 is installed and held in position by retaining ring 132.

Figure 7:
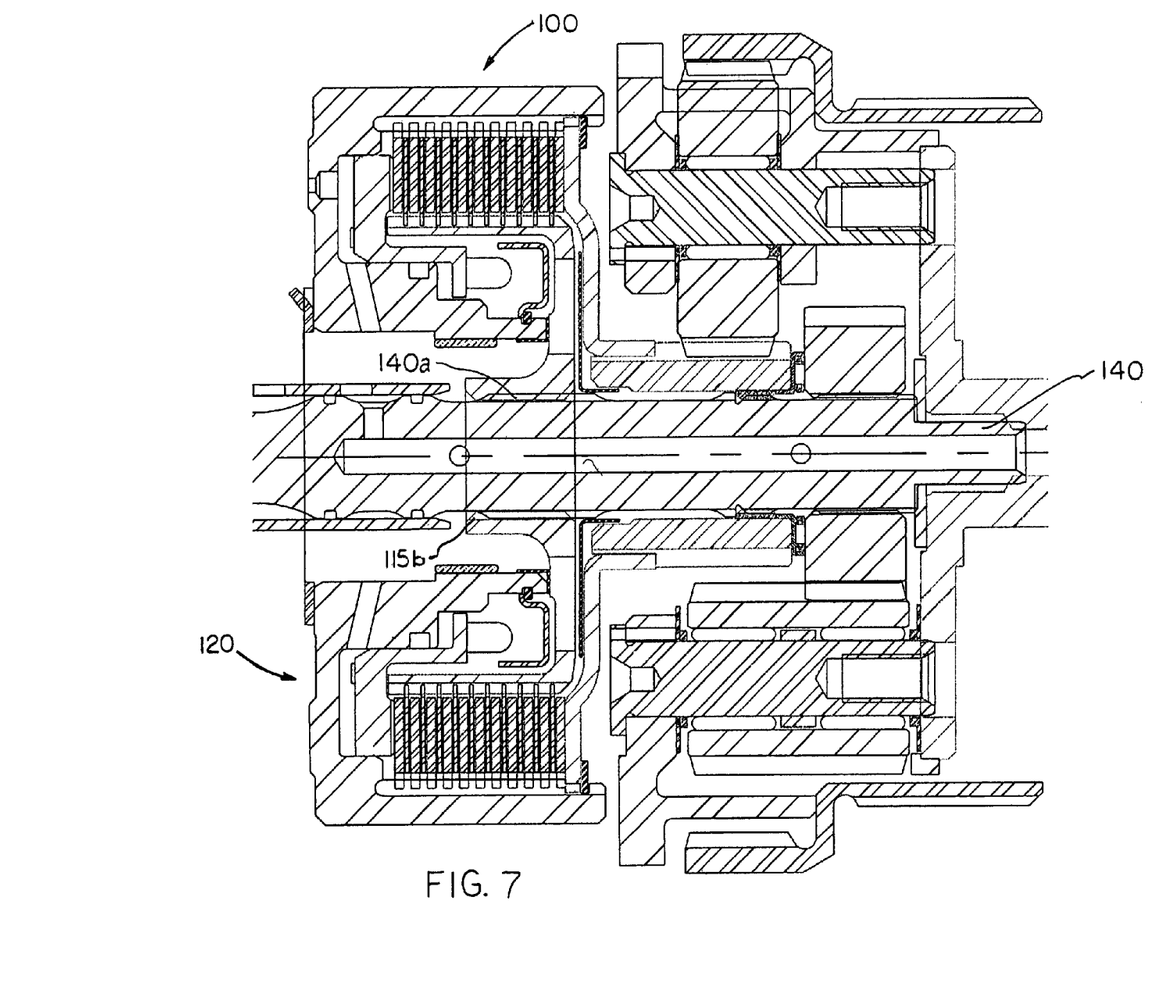
FIG. 7 is a cross-sectional view of present clutch pack assembly installed in its functional position in the Powerglide transmission.

Thereafter, the clutch assembly is ready for installation in its functional position on the mating spline 140a of the input shaft 140, which engages the internal spline 115b on the clutch hub 115 within the transmission as shown in FIG. 7.

In normal operation when the POWERGLIDE is in low gear, the low band 15 (refer to FIG. 1A) is applied to the outside diameter of the clutch drum 11 and the drum is held stationary. The clutch piston 125 is biased to the low gear position (i.e. piston displaced to bottom of its travel in piston bore) as shown in FIG. 2 and the frictions 110 spin freely within the clutch pack assembly 100 with the rotation of the input shaft 17.

In high gear ATF flows to the inlet ports 142 under increased pressure and enters piston chamber 145. In response to ATF pressure, the clutch piston 125 is stroked in the aft direction against the force of springs 127 compressing the steels 105 and frictions 110 axially against the pressure plate 135 to apply the high clutch. In this position the clutch drum 120 turns with the input shaft providing a one-to-one high gear ratio.

In summary, it can be seen that the present invention provides an improved clutch pack assembly for a POWERGLIDE transmission including an increased number of friction disks and steel disks, which provides substantially more friction surface area and increased clutch holding power without compromising performance.

Although not specifically illustrated in the drawings, it should be understood that additional equipment and structural components will be provided as necessary and that all of the components described above are arranged and supported in an appropriate fashion to form a complete and operative POWERGLIDE clutch pack assembly incorporating features of the present invention.

Moreover, although illustrative embodiments of the invention have been described, a latitude of modification, change, and substitution is intended in the foregoing disclosure, and in certain instances some features of the invention will be employed without a corresponding use of other features. Accordingly, it is appropriate that the appended claims be construed broadly and in a manner consistent with the scope of invention.

What is claimed is:

1. A high performance POWERGLIDE clutch assembly for replacement of the original equipment clutch assembly within a POWERGLIDE transmission, wherein the original equipment clutch assembly includes a clutch drum, a clutch hub, a clutch piston subassembly, and a clutch pack having four friction disks and five steel disks, said high performance clutch assembly comprising:

a high performance POWERGLIDE clutch pack including up to ten friction disks stacked in face-to-face relation with up to eleven steel disks, said high performance POWERGLIDE clutch pack having an increased axial length in comparison to the original equipment POWERGLIDE clutch pack;

a high performance POWERGLIDE clutch hub including weight reducing means for receiving said high performance POWERGLIDE clutch pack thereon;

a high performance POWERGLIDE clutch drum including a primary set of axial grooves having an increased length in comparison to the original equipment POWERGLIDE clutch drum, said axial grooves engaging a plurality of mating tabs formed on each of said up to eleven steel disks, said POWERGLIDE clutch drum also including weight reducing means comprising a secondary set of axial grooves disposed in parallel, spaced apart relation to said primary set of axial grooves at a position rotated 15 degrees about the center axis of said high performance POWERGLIDE clutch drum and located intermediate said primary set of grooves for receiving said high performance POWERGLIDE clutch hub and said high performance POWERGLIDE clutch pack therein;

a high performance POWERGLIDE clutch piston subassembly including a high performance POWERGLIDE clutch piston disposed within said high performance POWERGLIDE clutch drum functioning to alternately compress and release said high performance POWERGLIDE clutch pack to actuate the clutch assembly; and a pressure plate for retaining said high performance POWERGLIDE clutch pack, said high performance POWERGLIDE clutch hub, and said high performance POWERGLIDE clutch piston assembly in position within said high performance POWERGLIDE clutch drum.

2. The high performance POWERGLIDE clutch assembly of claim 1 wherein said high performance POWERGLIDE clutch hub includes an external spline formed thereon having an increased axial length in comparison to the original equipment POWERGLIDE clutch hub, said external spline engaging said up to ten friction disks each having a mating internal spline formed therein.

3. The high performance POWERGLIDE clutch assembly of claim 2 wherein said weight reducing means on said high performance POWERGLIDE clutch hub comprises a plurality of holes formed within a radial web portion thereof.

4. The high performance POWERGLIDE clutch assembly of claim 1 wherein said high performance POWERGLIDE clutch piston has a decreased axial length in comparison to the original equipment POWERGLIDE clutch piston to accommodate the increased axial length of said high performance POWERGLIDE clutch pack.

5. The high performance POWERGLIDE clutch assembly of claim 4 wherein said high performance POWERGLIDE clutch piston has an increased operating stroke in comparison to the original equipment POWERGLIDE clutch piston to compensate for the increased number of friction disks and steel disks in said high performance POWERGLIDE clutch pack.

6. The high performance POWERGLIDE clutch assembly of claim 5 wherein said high performance POWERGLIDE clutch piston further includes a radial lip seal installed about a leading edge of said high performance POWERGLIDE clutch piston, said radial lip seal engaging a mating surface of said high performance POWERGLIDE clutch drum.

7. A method of increasing the holding force of the original equipment clutch assembly within a POWERGLIDE transmission, wherein the original equipment POWERGLIDE clutch assembly includes a clutch drum having a primary set of axial grooves, a clutch hub having an external spline, a clutch piston subassembly, and a clutch pack having four friction disks and five steel disks, said method comprising the steps of:

lengthening said set of primary axial grooves formed in the original equipment POWERGLIDE clutch drum to provide a high performance POWERGLIDE clutch drum for receiving a high performance POWERGLIDE clutch pack including up to ten friction disks and up to eleven steel disks;

machining a set of secondary axial grooves within said high performance POWERGLIDE clutch drum in parallel, spaced apart relation to said set of primary axial grooves to reduce the overall weight of said high performance POWERGLIDE clutch drum;

providing a high performance POWERGLIDE clutch hub for receiving said up to ten friction disks and said up to eleven steel disks thereon;

arranging a high performance POWERGLIDE clutch pack having said up to ten friction disks and said up to eleven steel disks on said high performance POWERGLIDE clutch hub;

assembling a high performance POWERGLIDE clutch piston subassembly including a high performance POWERGLIDE clutch piston for installation in said high performance POWERGLIDE clutch drum for compressing said high performance POWERGLIDE clutch pack; and     installing said high performance POWERGLIDE clutch hub, said high performance POWERGLIDE clutch pack, and said high performance POWERGLIDE clutch piston subassembly within said high performance POWERGLIDE clutch drum to provide a high performance clutch assembly having up to a 150 percent increase in holding force with minimal increase in rotating mass.

8. The method of claim 7 wherein the step of providing further includes the steps of:

increasing the axial length of said external spline formed on said clutch hub to form a high performance POWERGLIDE clutch hub for receiving said high performance POWERGLIDE clutch pack; and     forming a plurality of weight reduction holes in a radial web portion of said high performance POWERGLIDE clutch hub to counterbalance the increased axial length and overall weight of said high performance POWERGLIDE clutch hub.

9. The method of claim 7 wherein the step of arranging further includes the step of:

stacking said up to ten friction disks and said up to eleven steel disks in alternating face-to-face relation to assemble said high performance POWERGLIDE clutch pack; and     sliding said high performance POWERGLIDE clutch pack including said up to ten friction disks and said up to eleven steel disks onto said high performance POWERGLIDE clutch hub.

10. The method of claim 7 wherein the step of assembling further includes the steps of:

reducing the overall axial length of said high performance POWERGLIDE clutch piston; and     increasing the axial length of an operating stroke of said high performance POWERGLIDE clutch piston in correlation to the increased number of friction disks and steel disks.

11. An improved POWERGLIDE transmission, wherein the original equipment POWERGLIDE transmission includes a high gear clutch assembly including a clutch drum, a clutch pack having four friction disks and five steel disks arranged coaxially for frictional engagement on a clutch hub, said clutch pack being axially compressed by a clutch piston subassembly to engage the high gear clutch, wherein the improvements comprise:

a high performance POWERGLIDE clutch drum including a primary set of axial grooves having an increased axial length in comparison to the original equipment POWERGLIDE clutch drum, said axial grooves engaging a plurality of mating tabs formed on each of said steel disks, said POWERGLIDE clutch drum also including weight-reducing means formed therein comprising a secondary set of axial grooves disposed in parallel, spaced apart relation to said primary set of axial grooves at a position rotated 15 degrees about the center axis of said high performance POWERGLIDE clutch drum and located intermediate said primary set of grooves;

a high performance POWERGLIDE clutch hub for receiving a high performance POWERGLIDE clutch pack thereon including up to ten friction disks and up to eleven steel disks therein, said high performance POWERGLIDE clutch hub also including weight-reducing means formed therein;

a high performance POWERGLIDE clutch piston subassembly including a high performance POWERGLIDE clutch piston having an increased operating stroke correlated to the combined axial length of said up to ten friction disks and said up to eleven steel disks; and     a pressure plate for retaining said high performance POWERGLIDE clutch pack, said high performance POWERGLIDE clutch hub, and said high performance POWERGLIDE clutch piston subassembly in position within said high performance POWERGLIDE clutch drum such that up to a 150 percent increase in friction surface area and holding force is obtained with minimal increase in rotating mass.

12. The improved POWERGLIDE transmission of claim 11 wherein said high performance POWERGLIDE clutch hub includes an external spline formed thereon having an increased axial length in comparison to the original equipment POWERGLIDE clutch hub, said external spline engaging said up to ten friction disks each having a mating internal spline formed therein.

13. The improved POWERGLIDE transmission of claim 12 wherein said weight reducing means on said high performance POWERGLIDE clutch hub comprises a plurality of holes formed within a radial web portion of said high performance POWERGLIDE clutch hub.

14. The improved POWERGLIDE transmission of claim 11 wherein said high performance POWERGLIDE clutch piston has a decreased axial length in comparison to the original equipment POWERGLIDE clutch piston to accommodate the increased axial length of said high performance POWERGLIDE clutch pack and said high performance POWERGLIDE clutch piston having an increased operating stroke in comparison to the original equipment POWERGLIDE clutch piston to compensate for said up to ten friction disks and said up to eleven steel disks in said high performance POWERGLIDE clutch pack.

15. An improved high performance POWERGLIDE clutch drum for replacement of the original equipment clutch drum in a POWERGLIDE transmission, wherein the original equipment POWERGLIDE clutch drum contains a clutch pack assembly including a plurality of friction disks and a plurality of steel disks, wherein each of said steel disks includes a radially projecting array of anti-rotation tabs disposed about the periphery thereof, wherein the original equipment POWERGLIDE clutch drum includes a primary set of axial grooves formed within an interior wall thereof for mating engagement with said array of anti-rotation tabs, wherein the improvement comprises:

weight reducing means integrated within said high performance POWERGLIDE clutch drum, said weight reducing means including a modified primary set of axial grooves having an increased axial length in comparison to said primary set of axial grooves to accommodate the assembled length of up to ten friction disks and up to eleven steel disks, wherein said weight reducing means further includes a secondary set of axial grooves formed in said interior wall intermediate said modified primary set of axial grooves in parallel relation thereto, said weight reducing means being sufficient to counterbalance the combined weight of said up to ten friction disks and said up to eleven steel disks such that up to a one-hundred and fifty percent increase in clutch friction surface area is obtained with minimal increase in rotating mass in comparison to said original equipment clutch pack assembly.

16. The improved high performance POWERGLIDE clutch drum of claim 15 wherein said secondary set of axial grooves includes twelve grooves having an axial length equivalent to said modified primary set of axial grooves.

17. The improved high performance POWERGLIDE clutch drum of claim 16 wherein said secondary set of axial grooves is configured for mating engagement with said array of anti-rotation tabs.

18. The improved high performance POWERGLIDE clutch drum of claim 15 wherein said high performance POWERGLIDE clutch drum is constructed of ductile iron material.

* * * * *